United States Patent
Batni et al.

(10) Patent No.: US 6,978,133 B2
(45) Date of Patent: Dec. 20, 2005

(54) MOBILE STATION ORIGINATION WHEN SERVING MOBILE SWITCHING CENTER IS NOT WIRELESS INTELLIGENT NETWORK CAPABLE

(75) Inventors: Ramachendra Prahlada Batni, Phoenix, AZ (US); Robert Thomas Calabrese, Naperville, IL (US); Neil Harrison, Cirencester (GB); Aftab Ahmed Khan, Richardson, TX (US); Michael Joseph Rudolph, Naperville, IL (US); Indrani Sen, Naperville, IL (US); Sridhar Sripathi, Columbus, OH (US); Ashish Trivedi, Naperville, IL (US); Yile Enoch Wang, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 472 days.

(21) Appl. No.: 10/253,090

(22) Filed: Sep. 24, 2002

(65) Prior Publication Data

US 2004/0058665 A1    Mar. 25, 2004

(51) Int. Cl.[7] .......................... H04Q 7/20; H04B 1/38; H04M 7/00; H04M 1/24; H04M 15/00
(52) U.S. Cl. ................ 455/432.1; 455/445; 455/426.1; 455/560; 455/428; 379/221.08; 379/221.09; 379/15.02; 379/114.28

(58) Field of Search .................. 455/461, 445, 455/560, 414.1, 418, 432.1, 426.1, 406, 433, 455/435.1, 552.1, 428; 379/15.02, 15.04, 379/114.28, 221.08, 221.09

(56) References Cited

U.S. PATENT DOCUMENTS

| | | | |
|---|---|---|---|
| 5,425,091 A * | 6/1995 | Josephs | 379/209.01 |
| 6,393,289 B1 * | 5/2002 | Bunting et al. | 455/445 |
| 6,782,258 B2 * | 8/2004 | Ung et al. | 455/432.1 |
| 6,879,676 B1 * | 4/2005 | Contractor | 379/211.01 |
| 2004/0242226 A1 * | 12/2004 | Bot et al. | 455/432.1 |

* cited by examiner

Primary Examiner—William Trost
Assistant Examiner—Wesley Kim

(57) ABSTRACT

A method and apparatus for providing wireless intelligent network services to mobile stations currently being served by a mobile switching center (S-MSC) that is not wireless intelligent network capable. The call is routed through a wireless intelligent network capable MSC (O-MSC). When the O-MSC receives the call, it requests instructions from a service control point (SCP) which provides a list of triggers for call states requiring further SCP instructions. Advantageously, this arrangement avoids the use of a double connection, using a loop-around trunk, in the O-MSC, as is required in the prior art.

10 Claims, 6 Drawing Sheets

(TO FIG. 3B)

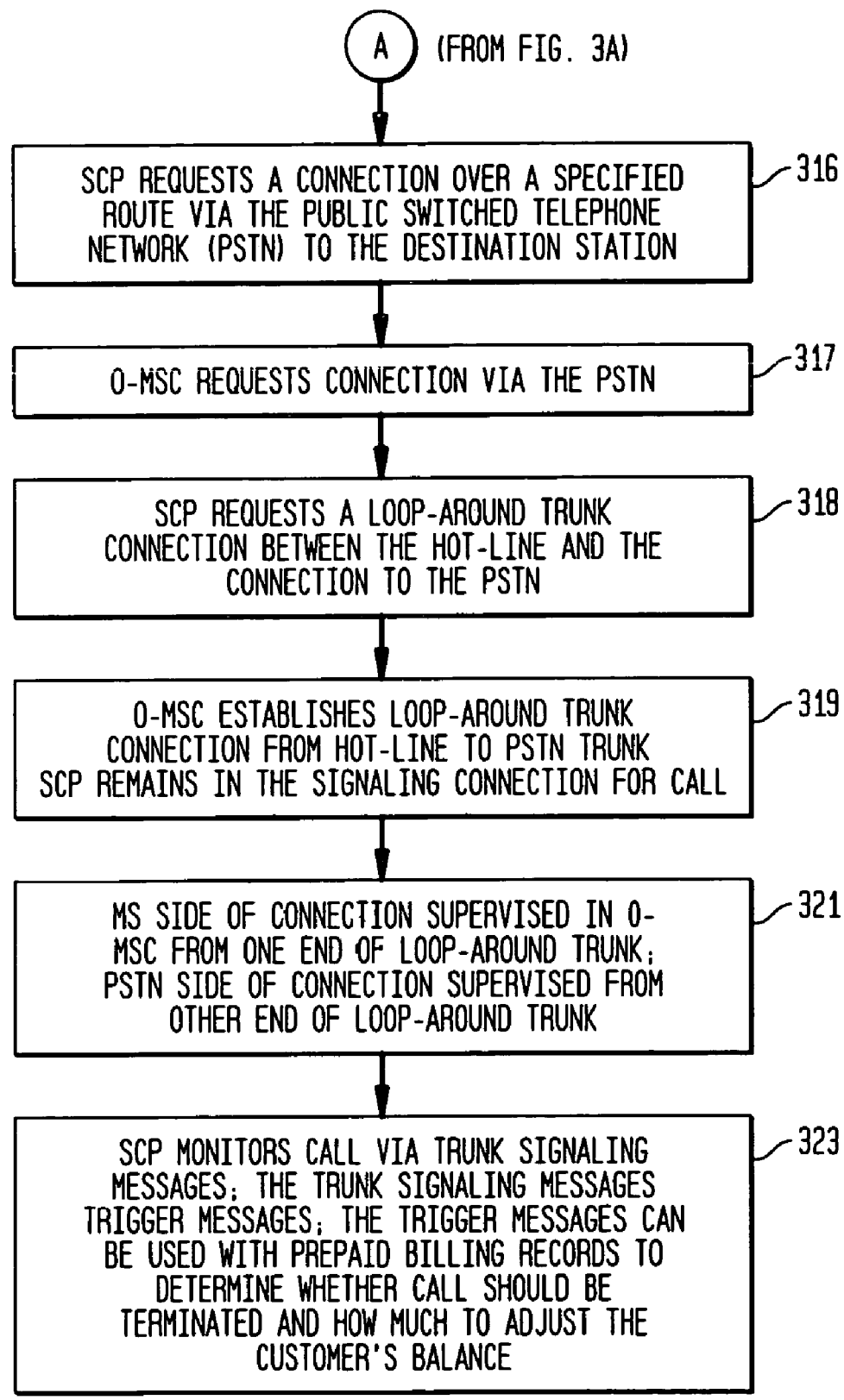

TITLE: MOBILE STATION ORIGINATION WHEN SERVING MOBILE SWITCHING CENTER IS NOT WIRELESS INTELLIGENT NETWORK CAPABLE

TECHNICAL FIELD

This invention relates to arrangements for providing wireless intelligent network services to mobile stations being served from Mobile Switching Centers that are not wireless intelligent network capable.

PROBLEM

Capabilities for a wireless intelligent network have only recently been introduced into the public wireless network; hence, there are still many Serving Mobile Switching Centers (S-MSC) (11) (FIG. 1) that are not capable of offering intelligent network services to the mobile stations that they serve. The prior art is shown in FIG. 1. Under these circumstances, a different MSC, hereinafter referred to as an O-MSC (12), is used to provide services when the S-MSC is not capable of providing required intelligent network (IN) services to a mobile station. However, a problem of the prior art is that the arrangements for providing intelligent network services to mobile stations not served by an IN capable MSC are inefficient. When the Serving MSC is not capable of triggering the necessary communications to the SCP, the service must be denied unless one of the previously described prior art schemes are available as a backup, in which case, all calls are connected to the hot-line number.

A connection (51) capable of carrying voice (53) (a bearer connection) and the associated communication signals (52) (a signaling connection), referred to as a hot-line, is established between the S-MSC (11) and the O-MSC (12). The hot-line connection is identified by a special hot-line telephone number. The O-MSC then establishes an internal voice connection (54) and a signaling connection (54) to a loop-around trunk (16) and a signaling connection (55), (56) to a service control point (SCP) (20). SCP, and links signaling links (52) and (55) and voice links (53) and (54). The SCP directly provides the intelligent network services to the originating mobile station. The SCP controls the establishment of the connection (58) from the loop-around trunk (16) to the Public Switched Telephone Network (PSTN) (30), over trunk (60) and signaling link (59), and thence via link (61) to the destination station (2). Disadvantageously, the establishment and supervision of the two connections to the two ends of the loop-around trunk requires large amounts of data processing resources for the O-MSC.

Additional prior art allows a trigger-capable MSC such as O-MSC (12) to suspend call processing, notify an SCP with some call processing parameters, and accept limited instructions on how to continue from that SCP. Commonly referred to as triggered events, these ANSI-41 operations may allow the SCP to direct the O-MSC to alter the direction of a call. For example, it can end the call, initiate a connection to play an announcement or collect digits, inform the O-MSC of altered digits or billing information, arm additional triggers, or simply continue the call.

SOLUTION

An advance is made over the prior art in accordance with this invention, wherein the service is allowed to continue in the absence of serving MSC trigger capabilities by statically arming an existing trigger on the O-MSC (Specific Called Party Digit String), to be responsive to receipt of a hot-line call. This trigger then initiates an operation when the incoming call has the digits of a known hot-line number. The O-MSC then suspends call processing, notifies the SCP, and accepts instruction to arm the triggers required to provide services. These could be many of the triggers the S-MSC was not capable of processing. The capabilities of the O-MSC for providing Intelligent Network (IN) services (such as connections to an IP for announcements and special digit collection capabilities) are directly provided by the O-MSC. The O-MSC recognizes a call initiated by the S-MSC as a request of the O-MSC to control the call and provide IN services to the incoming call. The incoming call is then treated in the same way as a call from a locally originated mobile station.

In one illustrative embodiment of Applicants' invention, prepaid telephone service is provided using this arrangement. The SCP keeps track of the balance available to a caller, and determines the charge for the call; if necessary, the call is denied because the caller's balance is less than the minimum charge for the call, or the call is terminated when there are insufficient funds in the balance to pay for any further time on the call.

The same general kind of an arrangement can be used to provide prepaid service to a land-line call or to provide prepaid service to the holder of the prepaid charge card when that holder is making a land-line call.

BRIEF DESCRIPTION OF THE DRAWING(S)

DETAILED DESCRIPTION

Figure 1:
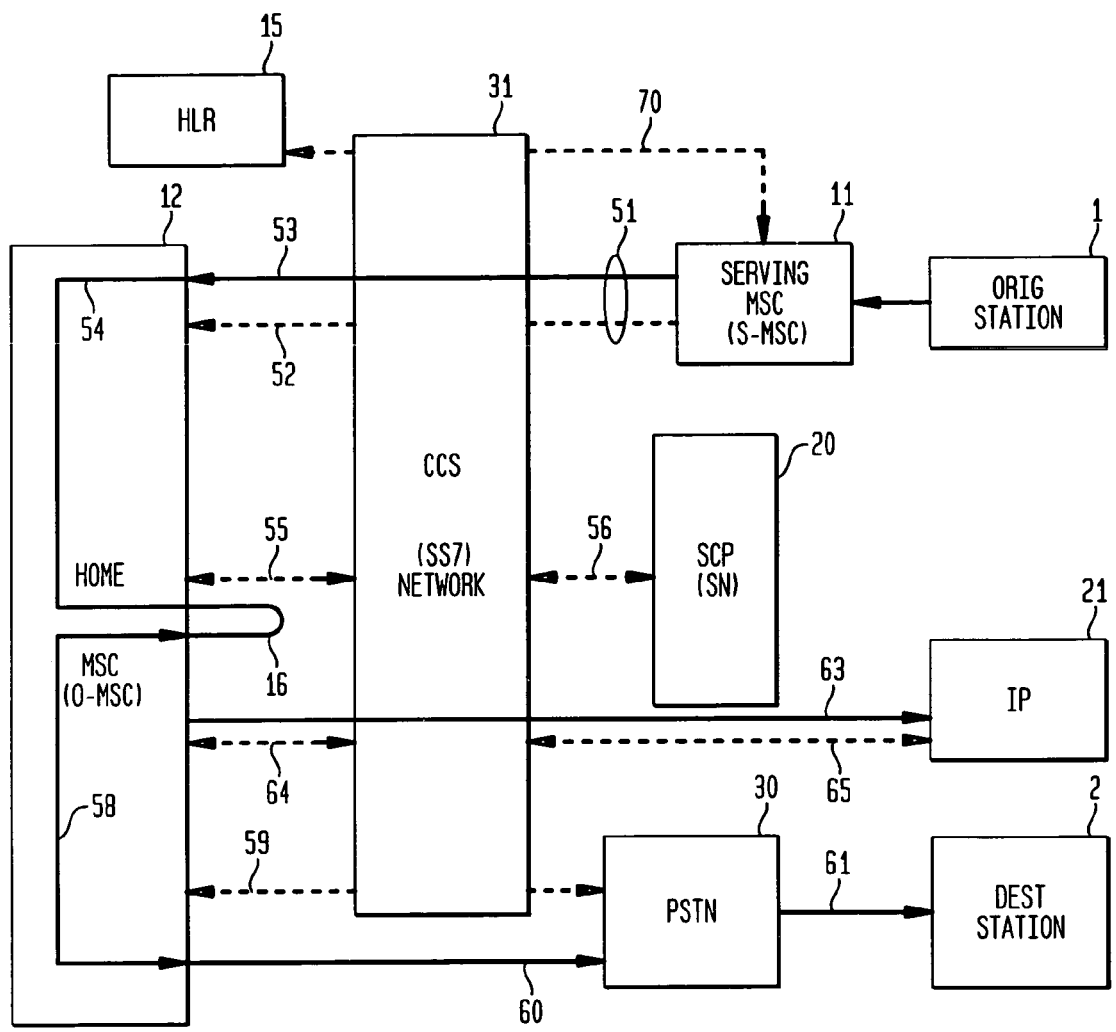
FIG. 1 is a block diagram illustrating the network architecture of the prior art.

FIG. 1 is a block diagram illustrating the operation of the prior art. Each solid line represents a bearer connection for carrying a communication signal, and each dashed line represents a signaling connection for carrying signaling messages. Signaling connections are transmitted through a Common Channel Signaling (CCS) (SS7) network (31). An originating station (1) wishes to place a call to a destination station (2) using prepaid service, an intelligent network service. The originating station is served by Serving Mobile Switching Center (S-MSC) (11). The S-MSC is not Wireless Intelligent Network (WIN) capable, and cannot provide prepaid calling service. The S-MSC, therefore, establishes a hot-line connection to an Originating MSC (O-MSC) (12) having WIN capabilities. The serving S-MSC signals to the O-MSC via the Common Channel Signaling Network (31), the request for the connection for the call. In accordance with the prior art, for a call received and identified by a hot-line number, the O-MSC is not capable directly of providing WIN services to the hot-line call in the same way that the O-MSC can provide WIN services to mobile stations currently served by the O-MSC. WIN services to stations served by an S-MSC not capable of providing WIN services are provided by the O-MSC using a loop-around trunk (ISUP Loop-Around Trunk) (16) the combination having Intelligent Network capabilities for recognizing trunk signaling events and causing the O-MSC to send and receive signaling messages to and from a Service Control Point (SCP) or Service Node (SN) (20). A service node as used herein has voice and signaling channels and can be used for directly monitoring calls. The SCP (20) controls services to the call, such as setting up a connection to an Intelligent Peripheral (21) for announcements and digit collection capabilities for collecting, for example, the identify of the prepaid calling card of the caller. The IP is accessed from the O-MSC (12) via bearer link (63), and responds via link (65), CCS network (31), and signaling link (64). Normally, the called party's telephone number, singly or in conjunction with the calling party's number, can be used to determine the rate. The SCP then determines the initial charge for the call, and decides whether sufficient funds are still available in the prepaid account to complete this call. If not, the call is rejected. If the call is not rejected, it is established on the basis of requests sent from the SCP and O-MSC via the Common Channel Signaling (CCS) Network (31) to the Public Switched Telephone Network (PSTN) (30), for establishing a connection from the O-MSC to the destination station. CCS Network (31) is connected by signaling link (70) to Serving MSC (11).

Figure 2:
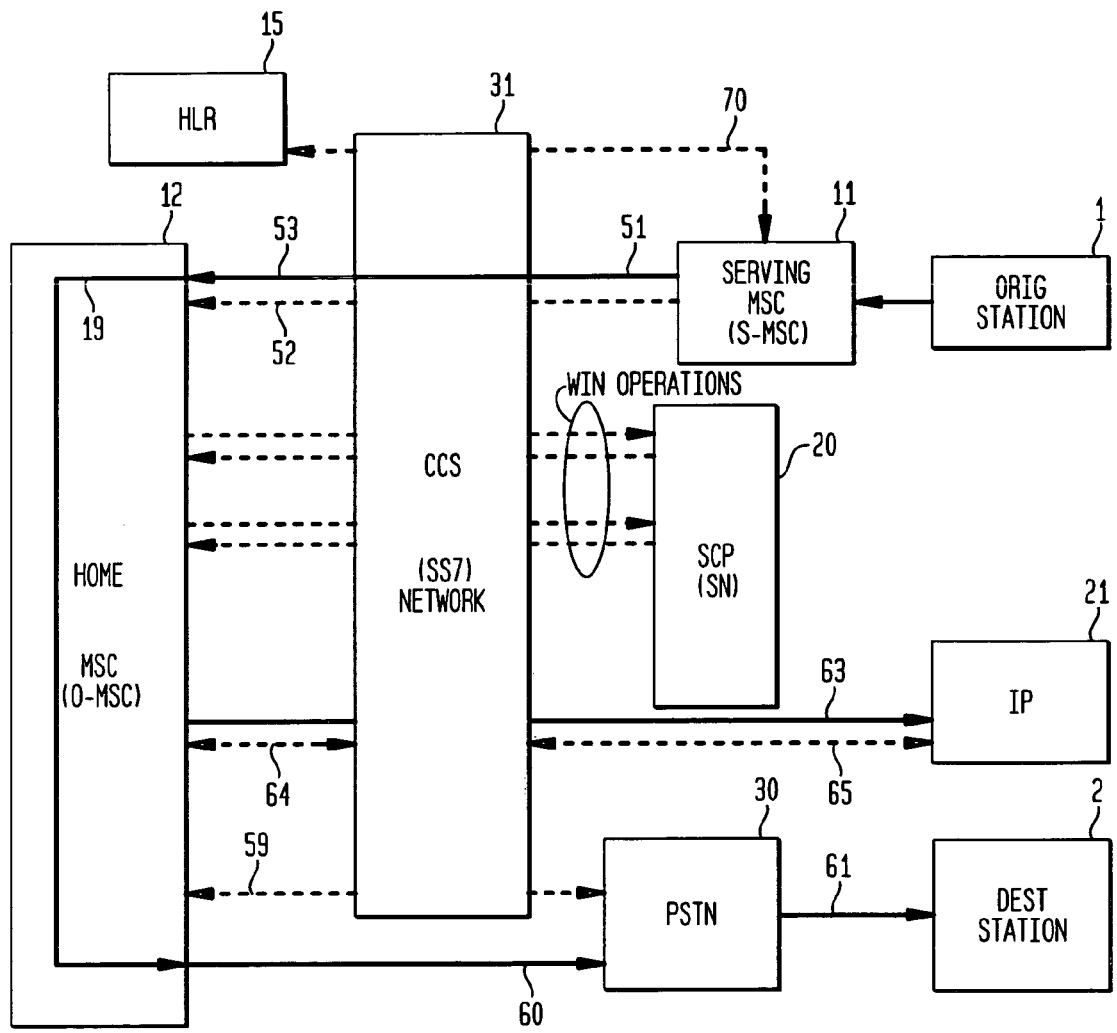
FIG. 2 is a block diagram illustrating the network architecture in accordance with the principles of this invention.

FIG. 2 illustrates the network architecture in accordance with the principles of Applicants' invention. The difference between FIG. 1 and FIG. 2 is that the loop-around trunk (16) has been removed. The associated call processing for establishing and monitoring the two ends of the loop-around trunk as if they were two separate calls is sharply reduced by using a call processing arrangement which directly controls the two parts of the connection as a single connection within a switching network of the O-MSC. The bearer connection between the originating station and the destination station is thus a simple connection, i.e., via the S-MSC, the hot-line connection (51, 53) to the O-MSC, the internal O-MSC connection (19), a link (60) from the PSTN, and the PSTN (30).

Figure 3A:
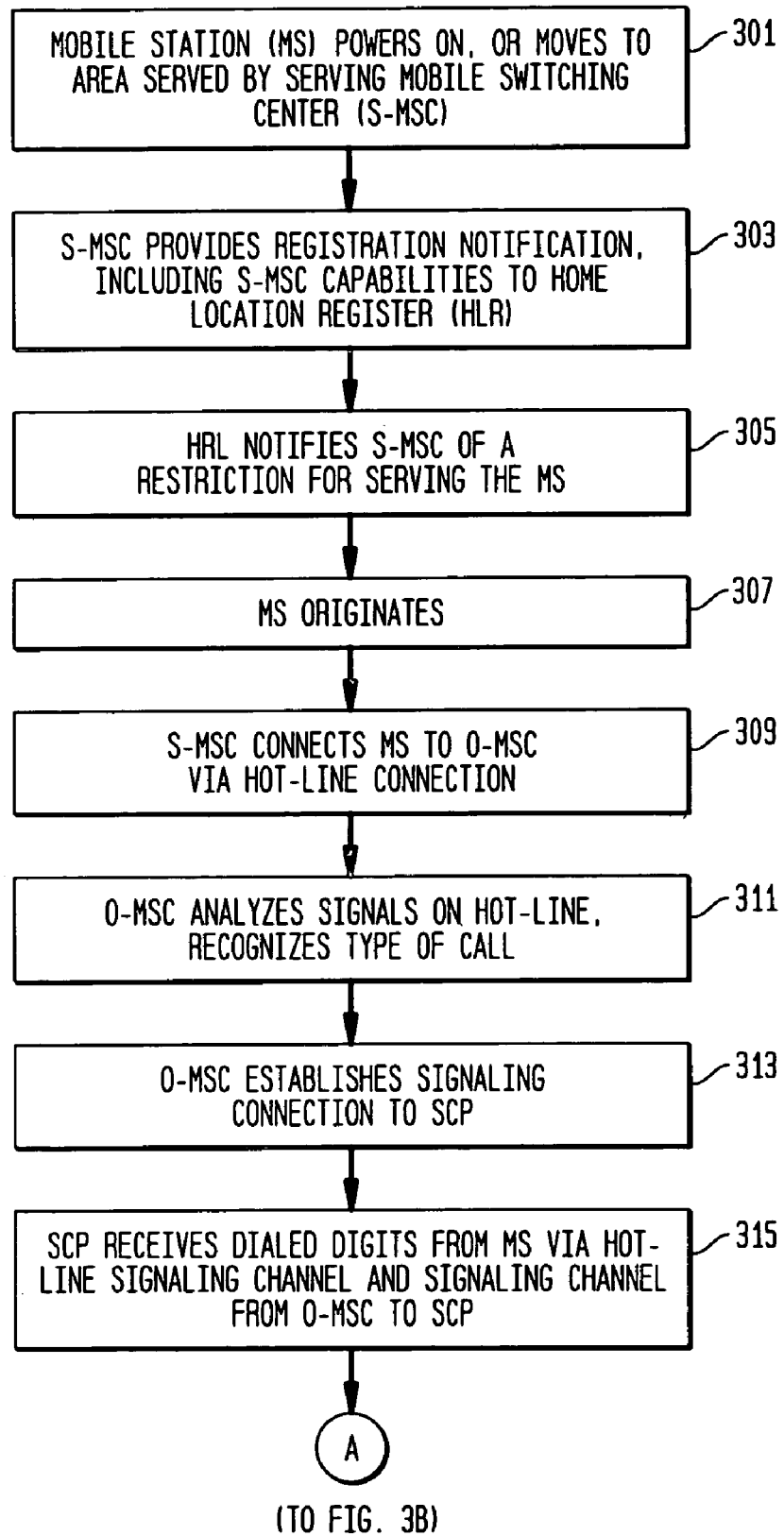
FIG. 3 is a flow diagram illustrating the processing of a prepaid call in accordance with the prior art.

FIG. 3 is a flow diagram illustrating how calls can be served by a Serving MSC (S-MSC), not equipped to handle most intelligent network features, with the help of the "Home MSC" (O-MSC) of a mobile station in accordance with the principles of the prior art. A mobile station (MS) powers-on in or moves, while powered on, into an area served by a Serving Mobile Switching Center (S-MSC) (action block 301). It is assumed that the S-MSC is not equipped to provide intelligent network features. The S-MSC provides registration notification, including the S-MSC capabilities to the Home Location Register (HLR) (15) of the mobile station, (action block 303). The HLR notifies the S-MSC of the restrictions on the S-MSC for serving the MS (action block 305). At some later time the MS originates a call (action block 307). The S-MSC connects the MS to the O-MSC via a hot-line connection (action block 309). The hot-line connection is a bearer connection with an associated signaling channel. The identity of the hot-line connection is provided by the HLR. Usually, but not necessarily, this hot-line connection is to the Home MSC of the mobile station, but it can also be to a WIN capable MSC that is closer. (This explains the use of the quotation marks around the word Home.) The O-MSC analyzes the signals received on the signaling channel for the hot-line, and recognizes the type of call as being a hot-line call, (action block 311). The O-MSC establishes a signaling connection to a controlling Switching Control Point (SCP) of the receipt of the hot-line call connection (action block 313). The SCP receives the dialed digits from the O-MSC (action block 315). The O-MSC had previously received these digits on the signaling channel associated with the hot-line. The SCP requests that the bearer connection from the hot-line remain in the O-MSC for subsequent connection to a call requested by the SCP at the next step.

The SCP next requests a connection, via routing specified by the SCP, over the Public Switched Telephone Network (PSTN) to the destination station (action block 316). The O-MSC then requests the connection via the PSTN (action block 317). The SCP requests a loop-around trunk connection between the hot-line and the connection to the PSTN (action block 318). The O-MSC establishes the requested loop-around trunk connection (action block 319). The SCP remains in the signaling connection. Thereafter, the mobile side of the connection is supervised from one end of the loop-around trunk; the PSTN side of the connection is supervised from the other end of the loop-around trunk (action block 321). The SCP then monitors the call via trunk signaling messages received on the loop-around trunk; the trunk signaling messages can be used with prepaid billing records to determine whether a call should be terminated, and how much to adjust the customer's balance (action block 323). If the call is to be terminated, it may be rerouted to an operator so that the operator can ask for payment via a credit card.

Figure 4A:
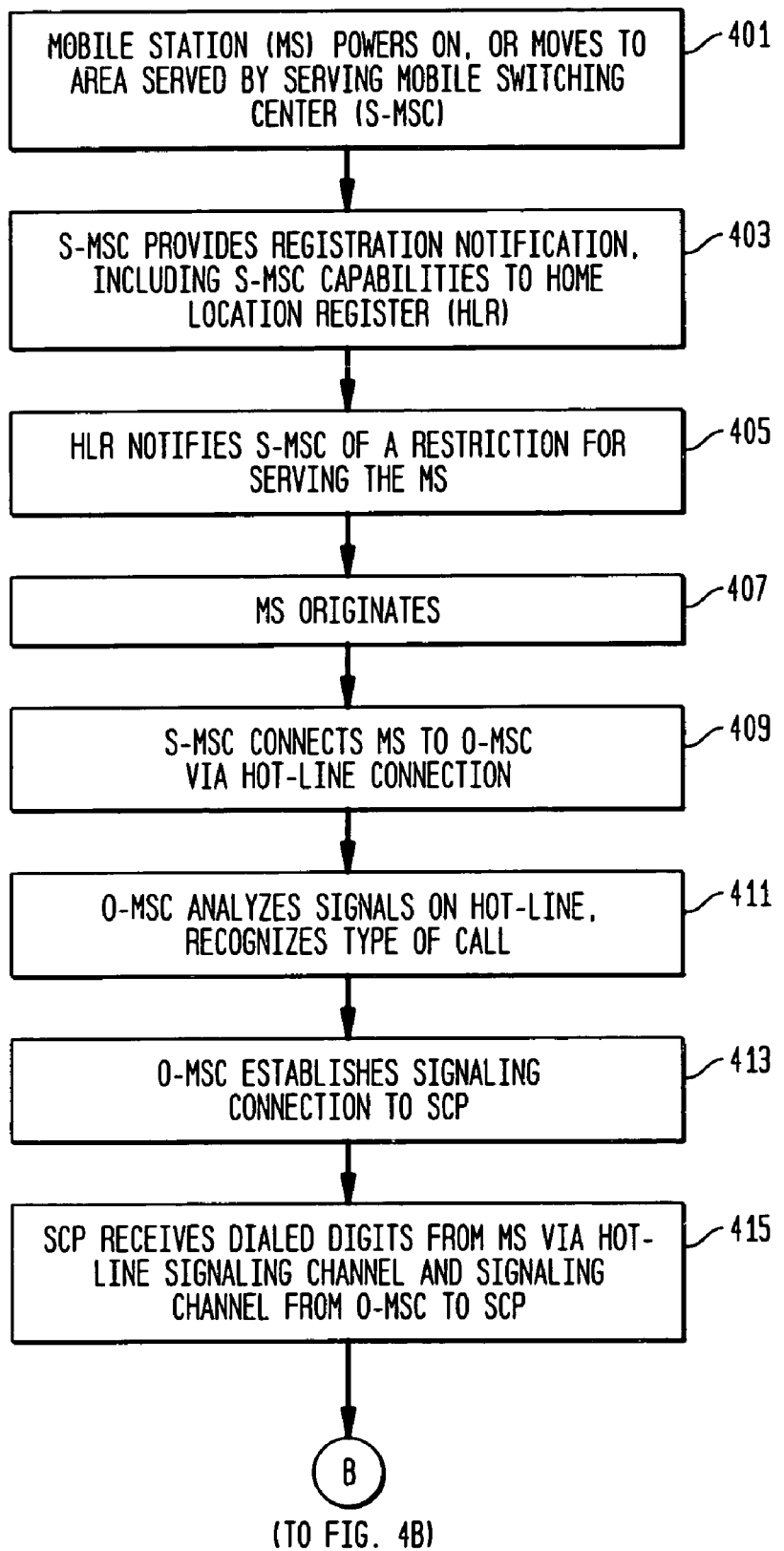
FIG. 4 is a flow diagram illustrating the operation of Applicants' invention for processing a prepaid call.
Figure 4B:
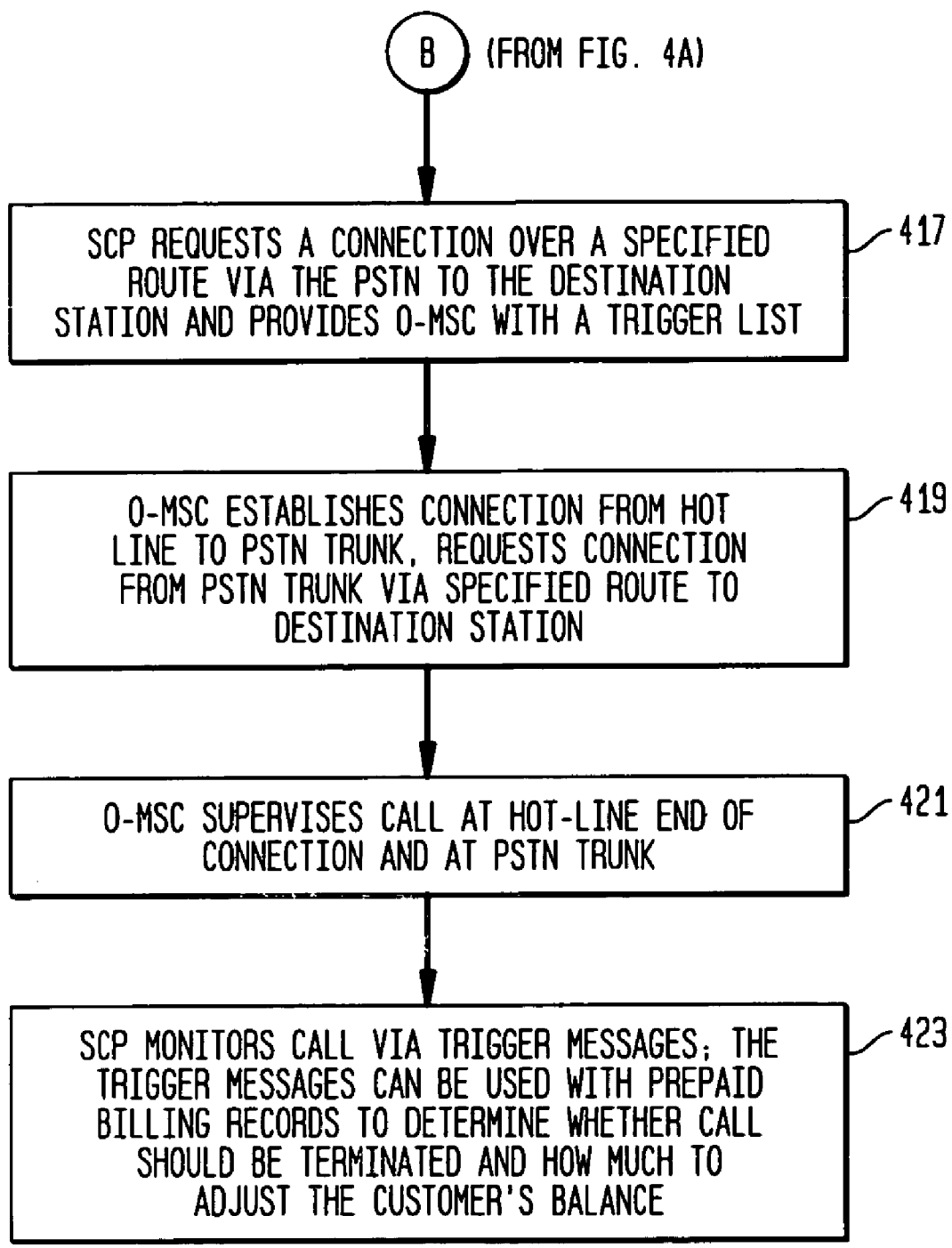

FIG. 4 illustrates the operation of Applicants' invention. Blocks 401–415 are equivalent to the prior art blocks 301–315 and will not be re-described. After the completion of action block 415, the SCP provides a trigger list to the O-MSC, and requests a call set-up over a specified route via the Public Switched Telephone Network to the destination (action block 417). The O-MSC establishes a connection from the hot-line to the PSTN trunk, and requests the PSTN to complete the connection (action block 419). The O-MSC supervises the call at the hot-line end of the connection and at the PSTN trunk (action block 421). In accordance with Applicants' invention, the SCP monitors the call via trigger messages from the O-MSC (action block 423). These trigger messages are generated by the O-MSC whenever one of the triggers on the trigger list (e.g., answer, disconnect) is encountered. The trigger messages can be used with prepaid billing records to determine whether the call should be terminated, and how much to adjust the customer's balance.

The same arrangement can be used to provide other intelligent network features such as virtual private network service and outgoing call screening.

Some triggers can call for the provision of interactive voice response services, for example, to collect a customer's personal identification number (PIN). When such a trigger situation is encountered, the O-MSC sets up a connection (63), using a signaling connection (65) from the incoming hot-line to an intelligent peripheral (IP) (21) with which a caller can communicate. The IP then signals any information that it has collected to the O-MSC, which passes this information on to the SCP.

A special type of prepaid service can be implemented from any telephone, by providing the user with the hot-line identification number. When that user dials the hot-line identification number, the user is connected to an O-MSC with WIN capabilities and, after providing the necessary identification using the interactive voice response capabilities of the system, can be provided with prepaid service.

The above is a description of one preferred embodiment of Applicants' invention as applied to one intelligent network feature. Other embodiments will be apparent to those of ordinary skill in the art with departing from the scope of the invention. The invention is only limited by the attached claims.

We claim:

1. A method of providing wireless intelligent network services to a mobile station currently served from a serving mobile switching center (S-MSC) that lacks wireless intelligent capability, comprising the steps of:
   in response to receipt of an originating service request from an originating mobile station served by said S-MSC, establishing a hot-line connection from said originating mobile station via said S-MSC to an originating MSC, (O-MSC) having wireless intelligent network capability;
   receiving and processing signaling messages from said S-MSC in said O-MSC;
   responsive to receipt of a set-up message comprising a destination station identification from said S-MSC in said O-MSC, querying a service control point (SCP) for instructions on how to establish a connection to a destination station;
   said SCP providing instructions and providing a list of call triggers of call situations for which a request message is to be sent to said SCP;
   establishing a direct connection within said O-MSC between said hot-line and an outgoing trunk to a public switched telephone network (PSTN);
   establishing a connection between said outgoing trunk and said destination station under the control of said O-MSC;
   sending request messages to said SCP whenever a trigger situation is encountered in said O-MSC; and
   executing instructions received in said O-MSC from said SCP in response to said request messages.

2. The method of claim 1 further comprising the step of:
   establishing a connection to an intelligent peripheral to play announcements, and to collect digits from a calling party.

3. The method of claim 1 further comprising the steps of:
   sending messages from said SCP to said O-MSC to request said O-MSC to insert a tone into the connection.

4. The method of claim 3 wherein said tone is for notifying a caller that the caller's remaining balance is low and that the caller should end a conversation.

5. The method of claim 1 further comprising the steps of:
   responsive to the caller dialing a hot-line identification number, the O-MSC setting up a connection to an intelligent peripheral for collecting information about the destination of the call and about an identification of the caller to identify the caller's account.

6. Apparatus for providing wireless intelligent network services to a mobile station currently served from a serving mobile switching center (S-MSC) that lacks wireless intelligent network capability, comprising:
   means, responsive to receipt of an originating service request from an originating mobile station served by said S-MSC, for establishing a hot-line connection from said originating mobile station via said S-MSC to an originating MSC (O-MSC) having wireless intelligent network capability;
   means for receiving and processing signaling messages from said S-MSC in said O-MSC;
   means, responsive to receipt of a set-up message, comprising a destination station identification, from said S-MSC in said O-MSC, for querying a service control point (SCP) for instructions on how to establish a connection to a destination station;
   said SCP comprising means for providing said instructions and providing a list of call triggers of call situations for which a request message is to be sent to said SCP;
   means for establishing a direct connection within said O-MSC between said hot-line and an outgoing trunk to a public switched telephone network (PSTN);
   means for establishing a connection between said outgoing trunk and said destination station under the control of said O-MSC;
   means for sending request messages to said SCP whenever a trigger situation is encountered in said O-MSC; and
   means for executing instructions received in said O-MSC from said SCP in response to said request messages.

7. The apparatus of claim 6 further comprising means for:
   establishing a connection to an intelligent peripheral to play announcements, and to collect digits from a calling party.

8. The apparatus of claim 6 further comprising:
   means for sending messages from said SCP to said O-MSC to request said O-MSC to insert a tone into the connection.

9. The apparatus of claim 8 wherein said tone is for notifying a caller that the caller's remaining balance is low and that the caller should end a conversation.

10. The apparatus of claim 6 further comprising:
    the O-MSC comprising means, responsive to the caller dialing a hot-line identification number, for setting up a connection to an intelligent peripheral for collecting digits about the destination of the call and about an identification of the caller to identify the caller's account.

* * * * *